United States Patent [19]

Sumiyoshi et al.

[11] 4,098,244
[45] Jul. 4, 1978

[54] CONTROL SYSTEM FOR AN INTERNAL COMBUSTION ENGINE

[75] Inventors: Masaharu Sumiyoshi; Osamu Ito, both of Toyota; Nobuhito Hobo, Inuyama; Yutaka Suzuki, Nishio; Takashi Hasegawa, Kariya; Makoto Shiozaki, Toyota, all of Japan

[73] Assignees: Nippondenso Co., Ltd., Kariya; Toyota Jidosha Kogyo Kabushiki Kaisha, Toyota, both of Japan

[21] Appl. No.: 641,874

[22] Filed: Dec. 18, 1975

[30] Foreign Application Priority Data

Sep. 23, 1975 [JP] Japan .................................. 50-115214

[51] Int. Cl.² .......................... F02P 5/04; F02P 5/14; F02P 5/06
[52] U.S. Cl. .............................. 123/117 R; 123/148 E
[58] Field of Search ......... 123/148 E, 32 EA, 32 EC, 123/117 R, 117 D, 146.5 A

[56] References Cited

U.S. PATENT DOCUMENTS

| | | | |
|---|---|---|---|
| 3,521,611 | 7/1970 | Finch | 123/146.5 A |
| 3,587,764 | 6/1971 | Bowles | 123/117 R |
| 3,896,773 | 7/1975 | Edison | 123/32 EA |
| 3,897,766 | 8/1975 | Pratt, Jr. et al. | 123/117 R |
| 3,898,894 | 8/1975 | Aono et al. | 123/148 E |

Primary Examiner—Verlin R. Pendegrass
Assistant Examiner—Thomas H. Webb
Attorney, Agent, or Firm—Cushman, Darby & Cushman

[57] ABSTRACT

A control system for an internal combustion engine wherein the torque developed by an internal combustion engine is detected to provide optimum control of the ignition timing of the engine and thereby to ensure an improved engine efficiency as well as an improved fuel economy. The system comprises an engine torque detector for detecting the torque developed by the engine, a signal generator for generating signals used to periodically change the ignition timing of the engine, a phase discriminator for discriminating the phase relation between the output signals of the engine torque detector and the periodic change signal generator, and ignition timing control means for controlling the ignition timing in response to the output of the phase discriminator.

7 Claims, 9 Drawing Figures

CONTROL SYSTEM FOR AN INTERNAL COMBUSTION ENGINE

BACKGROUND OF THE INVENTION

1. Field of the Invention

The present invention relates to a control system for an internal combustion engine wherein the torque developed by the engine is detected to automatically control th ignition timing of the engine toward attaining the optimum value and thereby to accomplish an improved engine efficiency as well as an improved fuel economy.

2. Description of the Prior Art

In the past, the ignition timing of an Otto-cycle internal combustion engine has been controlled according to a so-called program control wherein a spark advance pattern is preset using principally the number of revolutions and the boost pressure of the engine as controlling parameters and the pattern is followed faithfully. A disadvantage of this type of ignition timing control is that the optimum ignition timing for obtaining the maximum engine efficiency or the minimum fuel consumption rate cannot be programmed by using only two controlling parameters, i.e., the number of revolutions and the boost pressure of the engine and therefore one must be content with a relatively simple spark advance pattern in consideration of such limiting factors as the productivity and manufacturing cost of the required control system.

Another disadvantage of the conventional program control type ignition systems is that apart from the problem of incompleteness of such programmed pattern, these systems cannot overcome other problems such as the occurrence of errors due to the variations in characteristics among similar related units, e.g., engines and ignition systems, adjustment errors and the problem of change of characteristics with time caused by increased service time.

SUMMARY OF THE INVENTION

With a view to overcoming the foregoing difficulty, it is an intention of the present invention to accomplish the optimum control of the ignition timing of an internal combustion engine by taking advantage of the correlation between the torque developed by the engine and the fuel consumption rate. In other words, under constant driving conditions of the engine where the engine revolutions, the throttle opening and the air-fuel ratio are held constant, if the ignition timing is varied more or less with respect to the optimum value $\theta_o$, the torque T developed by the engine and the fuel consumption rate Fcr vary with the variation of the ignition timing as shown by th characteristic curves in FIG. 1 of the accompanying drawings, and the ignition timing where the maximum torque occurs and that where the minimum fuel consumption rate occurs take the same value $\theta_o$.

In this case, when the ignition timing deviates from the optimum value $\theta_o$, the engine efficiency decreases in proportion to the deviation and the torque developed by the engine decreases for the same engine revolutions and the same air-fuel quantity. Thus, by detecting the torque developed by the engine with an engine torque detector and obtaining the maximum value of the detected torque signals, it is possible to obtain the ignition timing $\theta_o$ where the maximum engine efficiency or the minimum fuel consumption rate occurs.

It is therefore an object of the present invention to provide a control system for an internal combustion engine wherein the torque developed by the engine is detected by an engine torque detector and the ignition timing of the engine is periodically changed, whereby the variation of the engine torque with the periodic variation of the ignition timing is detected by the engine torque detector, and the phase relation between the varying phase of the ignition timing and the detected torque signal is discriminated by a phase discriminator to thereby control the advance or retard of the ignition timing.

Figure 1:
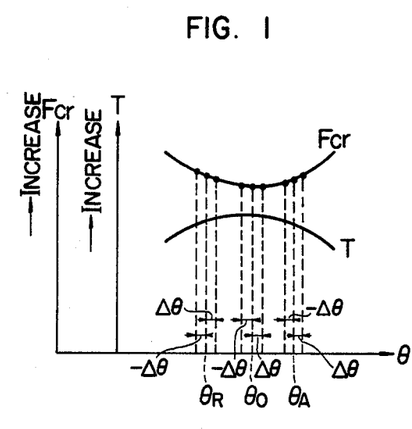
FIG. 1 is a characteristic diagram showing the relationship between the engine torque and the fuel consumption rate of an ordinary internal combustion engine when the ignition timing is changed.

Assuming now that $+\Delta\theta$ denotes that the ignition timing must be advanced $\Delta\theta$, $-\Delta\theta$ denotes that the ignition timing must be retarded $\Delta\theta$ and $\Delta TE$ designates the corresponding change in the torque signal, it is necessary for the phase discriminator to generate the following outputs as will be seen from FIG. 1:

$$(A) \begin{cases} +\Delta\theta \to \Delta TE < 0 \\ -\Delta\theta \to \Delta TE > 0 \end{cases} \text{ignition timing retard output}$$
$$\begin{cases} +\Delta\theta \to \Delta TE > 0 \\ -\Delta\theta \to \Delta TE < 0 \end{cases} \text{ignition timing advance output}$$
$$\pm\Delta\theta \to \Delta TE = 0 \quad \text{constant ignition timing output}$$

Thus, under the steady state driving conditions, it is possible to control the ignition timing with the accuracy to within $\pm\Delta\theta$ of the optimum ignition timing $\theta_o$ by controlling the ignition timing to satisfy the above-mentioned output conditions of the phase discriminator. In FIG. 1, $\theta_R$ designates an ignition timing which is excessively retarded and $\theta_A$ designates another ignition timing which is excessively advanced.

Thus, in accordance with the present invention the ignition timing of an engine is periodically changed and the corresponding variation in the engine torque is detected by an engine torque detector. The phase relation between the two is discriminated by a phase discriminator to control the ignition timing. In this way, the ignition timing is automatically controlled for variations in various driving conditions with the optimum ignition timing as the desired value, thereby improving the engine efficiency and ensuring an improved fuel economy.

DESCRIPTION OF THE PREFERRED EMBODIMENT

The present invention will now be described in greater detail with reference to the illustrated embodiment.

Figure 2:
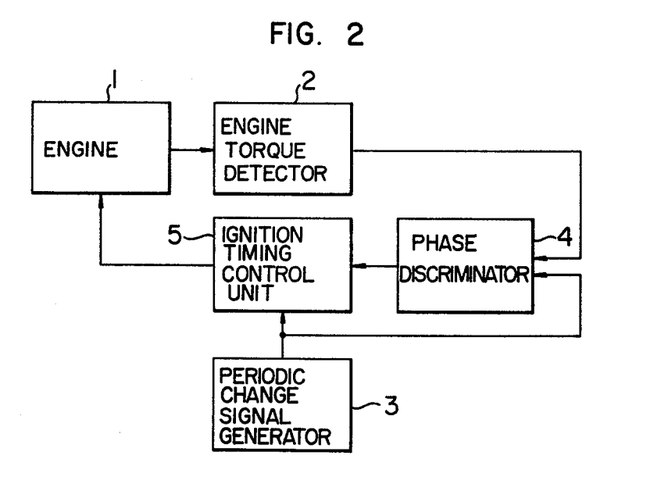
FIG. 2 is a block diagram showing the construction of a control system according to the invention.

Referring first to the block diagram of FIG. 2 showing the construction of a control system according to the invention, numeral 1 designates an internal combustion engine, 2 an engine torque detector, 3 a periodic change signal generator, 4 a phase discriminator, 5 an ignition timing control unit. The engine torque detector 2 detects the torque developed by the engine, and the periodic change signal generator 3 generates signals for periodically changing the ignition timing. In response to the operation of these elements, the ignition timing control unit 5 comes into operation so that the ignition timing is changed $\Delta\theta$ at a predetermined repetition period. When this occurs, the efficiency of the engine varies periodically and hence the engine torque changes periodically. The change of the engine torque is detected by the engine torque detector 2 and its phase is compared with that of the signal generated from the periodic change signal generator 3 to determine in accordance with the above-mentioned conditions (A) a direction in which the ignition timing is to be controlled.

Figure 3:
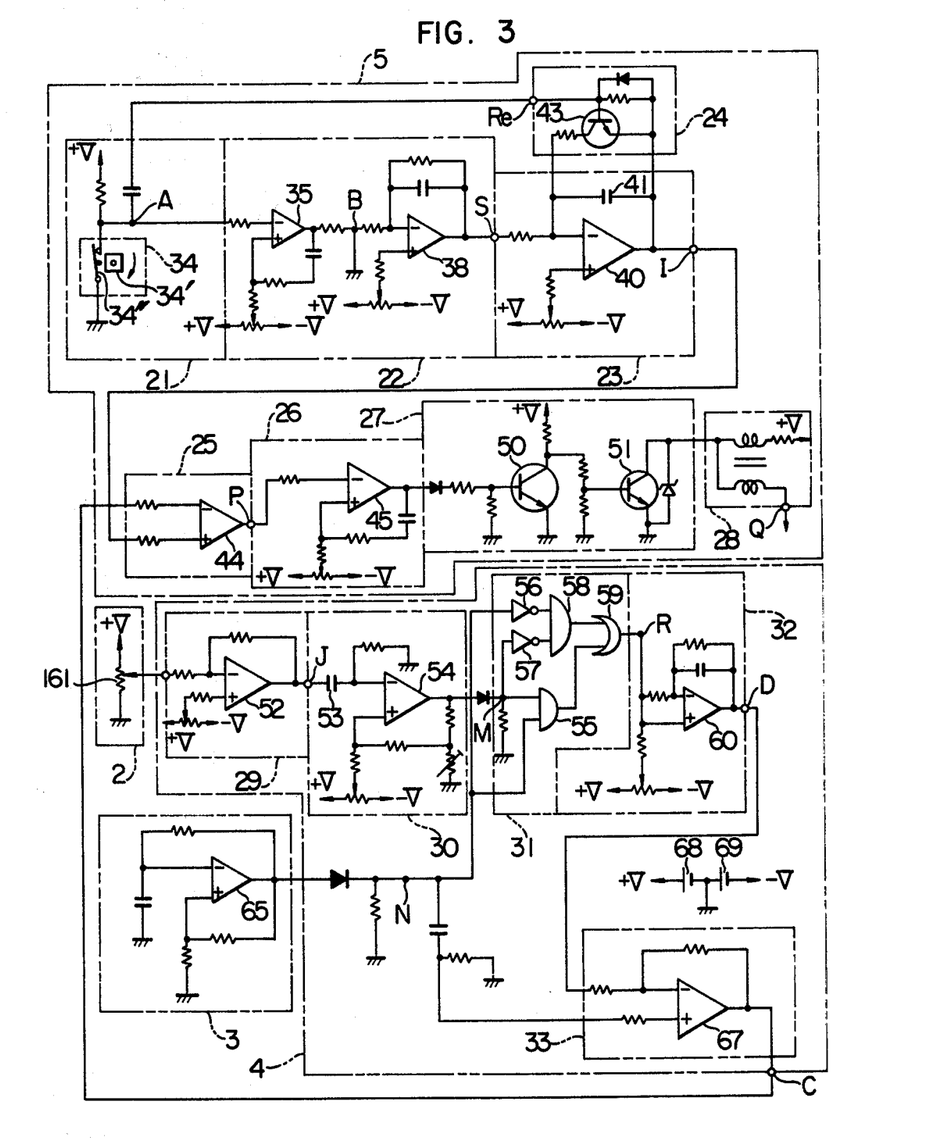
FIG. 3 is a wiring diagram showing an embodiment of the control system of the invention.

A specific embodiment of the control system according to the invention will now be described with reference to the wiring diagram of FIG. 3. The embodiment of FIG. 3 is designed so that the ignition timing is controlled through electronic circuitry. In FIG. 3 are shown one embodiment of the periodic change signal generator 3 and the phase discriminator 4, respectively, and the torque developed by the engine is fed back to thereby accomplish the optimum control of the ignition timing. The ignition timing control unit 5 is controlled in accordance with the voltage at a point C or control voltage $V_C$. The periodic change signal generator 3 generates signals for periodically changing the ignition timing by $\Delta\theta$ and the engine torque detector 2 detects the torque developed by the engine. The phase discriminator 4 compares the phase of the signal generated from the periodic change signal generator 3 and that of the engine torque signal generated from the engine torque detector 2 to determine whether the ignition timing is to be advanced or retarded and it generates an ignition timing control signal $V_C$. The ignition timing control unit 5 comprises a timing signal generator 21, a frequency-to-voltage converter 22, an integrator 23 and its reset circuit 24, a comparator 25, a monostable multivibrator 26, an ON-OFF amplifier circuit 27 and an ignition coil 28. The timing signal generator 21 generates a timing signal at every predetermined angle of engine crankshaft rotation and in this embodiment it comprises a contact type timing signal generator 34 of the known type which opens and closes contact points 34″ by a cam mechanism 34′ operatively associated with the engine crankshaft. In this embodiment the normally closed contact points 34″ open at the top dead center on the compression stroke of a 4-cylinder internal combustion engine and generates a positive going timing signal at a point A.

The frequency-to-voltage converter 22 is a circuit for generating a DC speed voltage proportional to the number of revolutions of the engine, in which a known type of monostable multivibrator comprising a differential operational amplifier 35 is triggered by the timing signal generator 21 to reshape the input into pulses having a predetermined time width $\tau$ which in turn are integrated by a known type of integrator comprising a differential operational amplifier 38 to convert into a D.C. speed voltage $V_S$.

Figure 4:
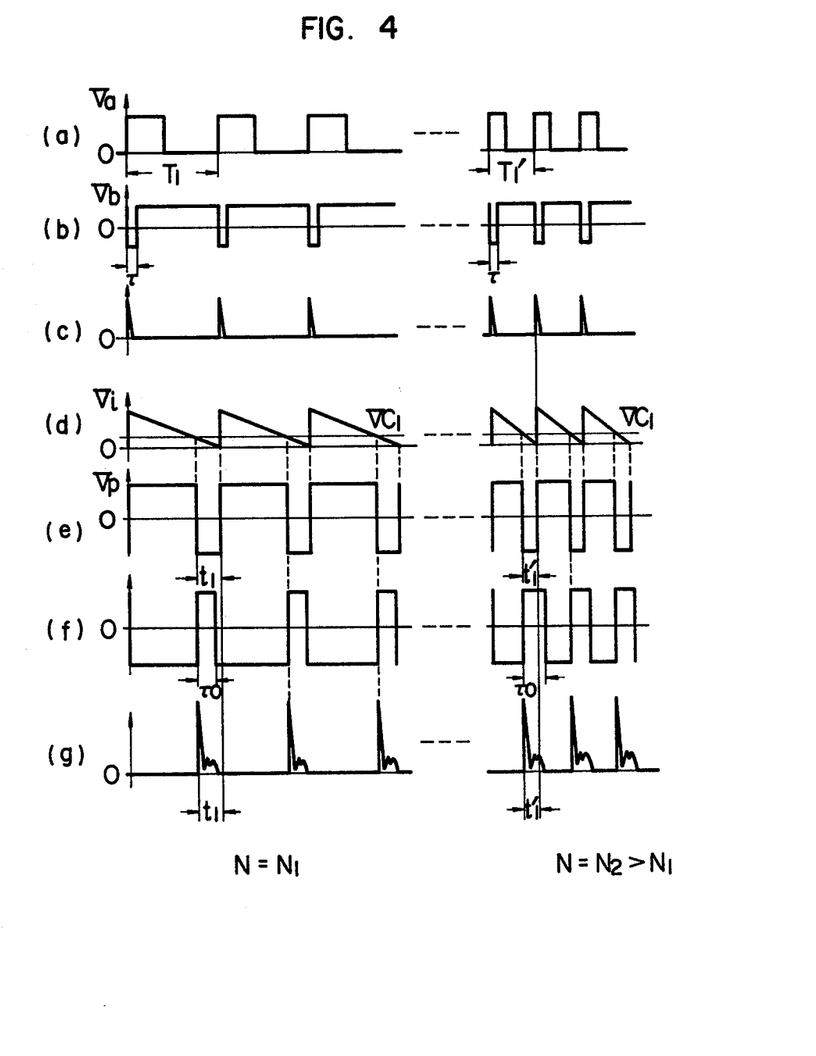
FIG. 4 is a voltage waveform diagram which is useful in explaining the operation of the ignition timing control unit in the control system shown in FIG. 3.
Figures 5, 6, 7:
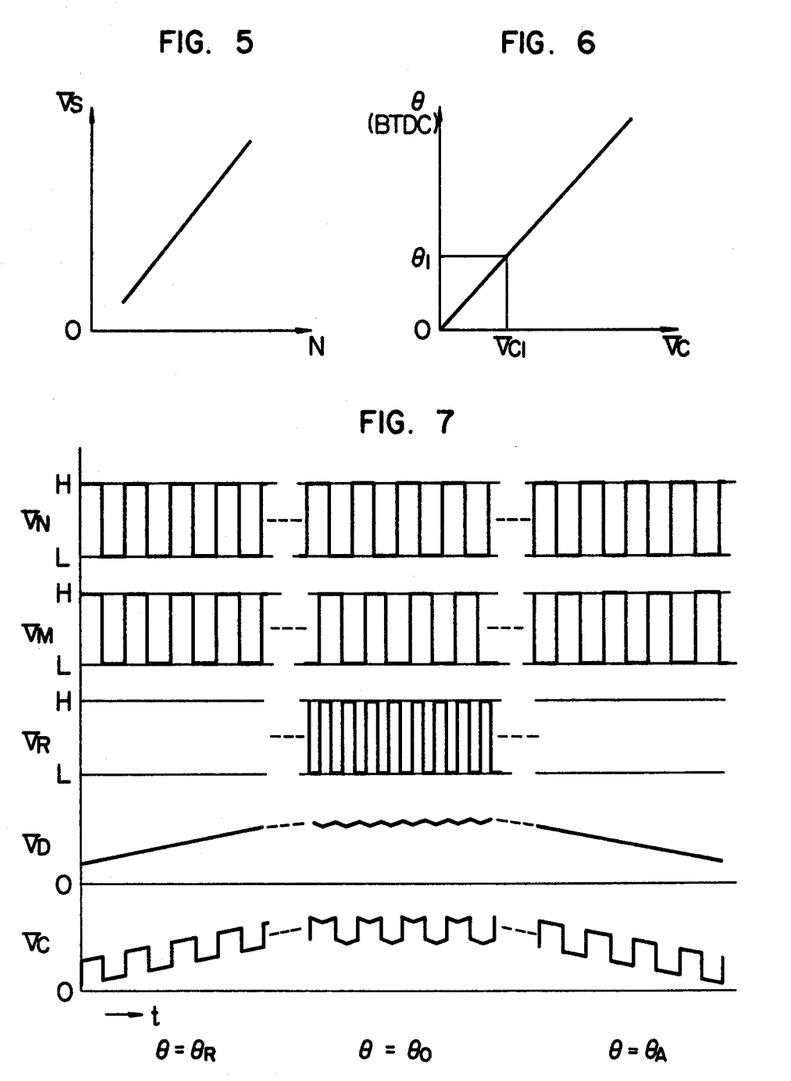
FIG. 5 is a characteristic diagram of the frequency-to-voltage converter used in the control system of FIG. 3.
FIG. 6 is a control voltage versus spark advance characteristic diagram of the ignition timing control unit in the control system of FIG. 3.
FIG. 7 is a voltage waveform diagram which is useful in explaining the operation of the phase discriminator in the control system of FIG. 3.

Waveforms (a) and (b) in FIG. 4 respectively show the voltage waveforms generated respectively at the points A and B in FIG. 3. In the figure, the voltage waveforms generated when the number of engine revolutions $N = N_1$ are shown on the left side and those generated when the number of engine revolutions $N = N_2 (N_2 > N_1)$ are shown on the right side. The characteristic of the speed voltage $V_S$ versus the number of engine revolutions N is shown in FIG. 5 and the speed voltage $V_S$ is proportional to the engine revolutions N. Namely, $$V_S = KN \tag{1}$$

The integrator 23 is a known type of integrator comprising a differential operational amplifier 40 which integrates the speed voltage $V_S$ generated by the frequency-to-voltage converter 22. However, the integrator 23 includes the reset circuit 24 so that the positive going timing signal from the timing signal generator 21 is applied as a reset signal and a transistor 43 is turned on for a very short period of time to discharge the charge on an integrating capacitor 41 and thereby to reset the integrator 23. Consequently, the integrator 23 integrates the speed voltage $V_S$ with the period between the time of its resetting by one reset signal and the time of generation of the next reset signal as the integration period $T_1$. This integration period $T_1$ is equal to the repetition period of the timing signals generated from the timing signal generator 21. As a result, the integration period $T_1$ is inversely proportional to the engine revolutions N, namely $$T_1 = K'/N \tag{2}$$

Under constant driving conditions where the engine revolutions N are constant, the output voltage $V_i$ of the integrator 23 at a point I is given $$V_i = -\int V_S dt = VM - V_S t \tag{3}$$

where $0 \leq t \leq T_1$ and VM is the initial value which is a constant.

Consequently, when $t = T_1$, the integrator 23 is reset to return to the value of $t = 0$ and therefore the waveform of the output voltage $Vi$ has the sawtooth waveshape shown in (d) of FIG. 4. Substituting the above equations (1) and (2) in the above equation (3), the maximum value (max) and minimum value (min) of the output voltage $Vi$ are given as Maximum value $V_i(\text{max}) = VM$ when $t = 0$
Minimum value $V_i(\text{min}) = VM - V_s \cdot T_1 =$
$VM - KN \cdot \dfrac{K'}{N} = VM - KK'$ when $t = T_1$ Consequently, the maximum and minimum values of the sawtooth waveform $V_i$ are both constant independently of the engine revolutions thus forming the waveform shown in (d) of FIG. 4. Waveform (c) in FIG. 4 shows the phase relation of the voltages (the voltages at a point $R_e$) applied to the base of the transistor 43 in the reset circuit 24.

Figure 8:
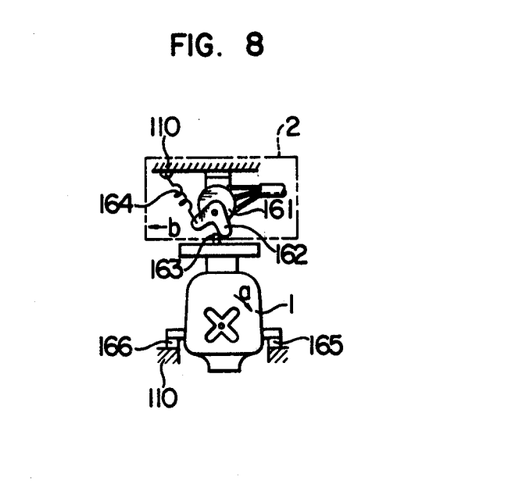
FIG. 8 is a schematic diagram showing a form of the engine torque detector used in the control system of this invention.

The comparator 25 comprises a differential operational amplifier 44 which compares the sawtooth waveform voltage $V_i$ at the point I with the ignition timing control voltage $V_c$ at the point C for controlling the ignition timing. The sawtooth voltage $V_i$ is applied to the operational amplifier 44 as its non-inverting input and the control voltage $V_C$ is applied as its inverting input. Waveforms (d) and (e) in FIG. 4 show the phase relationships between its input signals and its output voltage $V_P$ at an output terminal P when the control voltage $V_C = V_{C1}$. The output voltage $V_P$ determines the negative polarity ignition timing which is advanced by $t_1$ when $N = N_1$ and by $t'_1$ when $N = N_2$ as compared with the timing signal. It will be seen from this figure that there is a relation $t_1/T_1 = t'_1/T_1'$ where $T_1$ and $T_1'$ respectively represent the ignition repetition periods for $N = N_1$ and $N = N_2$ and therefore it is apparent that the advance angle $\theta$ of the ignition timing with respect to the timing signals may be linearly determined in accordance with the control voltage $V_C$ independently of the engine revolutions N. This is shown in FIG. 6 in which the abscissa represents the advance angle $\theta$ in relation to the top dead center. The monostable multivibrator 26 comprises a differential operational amplifier 45 and it is triggered by the rising edge of the negative going pulse voltage generated from the comparator 25 to generate a pulse voltage having a predetermined time width $\tau_o$. This pulse voltage is amplified by an amplifying transistor 50 and determines the time of turning off of a transistor 51 which switches on and off the primary circuit of the ignition coil 28. When the control voltage $V_c = V_{c1}$, the time of turning off the transistor 51 advances $\theta_1$ from the top dead center and the time of generation of ignition sparks in the engine is correspondingly advanced. The duration of off-time of the transistor 51 becomes $\tau_o$ as shown in (f) of FIG. 4. The voltage generated at a point Q in the secondary winding of the ignition coil 28 is distributed to the spark plugs of the engine by a distributor of the type normally used in the spark-ignition engines. The periodic change signal generator 3 generates signals for periodically changing the ignition timing of the engine by $\Delta\theta$ and it comprises a differential operational amplifier 65 to constitute an astable multivibrator circuit which generates a rectangular voltage at a predetermined repetition period, namely, it generates at a point N a binary output voltage $V_N$ which alterately goes to "H" and "L" levels. The phase discriminator 4 comprises a phase detector circuit 31 for generating a phase detection output $V_R$ corresponding to the phase relation between the periodic change signal and the engine torque signal, an integrator 32 for integrating the output voltage $V_R$ and an adder 33 for superimposing the periodic change signals on the output voltage $V_D$ of the integrator 32 and the ignition timing control voltage $V_C$ is generated at an output terminal C of the adder 33. The engine torque detector 2 which generates an output signal corresponding to the torque developed by the engine may be constructed as shown in FIG. 8 in which the engine 1 of the vehicle is mounted on a vehicle body 110 through the intermediary of mounting rubbers 165 and 166 and the engine torque is detected by virtue of the fact that the amount of deflection of the mounting rubbers 165 and 166 changes in response to a variation of the torque developed by the engine 1 and the body of the engine 1 produces a twisting motion approximately about its rotating shaft. In other words, one ends of the mounting rubbers 165 and 166 are secured to the engine 1 and the other ends are secured to the vehicle body 110. Consequently, when the rotating shaft of the engine 1 rotates in the direction shown by an arrow $a$, the torque developed by the engine 1 causes a twisting force about the engine 1 causes a twisting force about the rotating shaft of the engine 1 and this twisting force acts as a couple of forces in the direction opposite to the direction of the rotation. As a result, the load on the mounting rubber 166 increases by an amount corresponding to the couple with a resulting increase in the amount of its deflection, while the load on the mounting rubber 165 decreases by an amount corresponding to the couple with a resulting decrease in the amount of its deflection. Consequently, a change detecting point 163 which is secured to the engine 1 is displaced in the direction of an arrow $b$ relative to the vehicle body 110. This displacement is transmitted to a potentiometer 161 through a lever 162 (a return spring 164 is provided between the lever 162 and the vehicle body 110 so that the lever 162 is normally urged in the direction of the arrow $b$) and consequently an electric torque signal corresponding to the engine torque is generated in the potentiometer 161. In this way, a change in the engine torque is detected by the torque detector 2 as a change in the electrical detection signal. This detection signal is amplified by an amplifier 29 comprising a differential operational amplifier 52 and a torque voltage $V_J$ is generated at a point J. The polarity of the torque voltage $V_J$ is selected so that the torque voltage $V_J$ decreases as the engine torque increases. Only this change of the torque voltage $V_J$ is applied through a coupling capacitor 53 to a differential operational amplifier 54 in a Schmitt circuit 30 and a binary output voltage $V_M$ is generated at a point M which is either the "H" level or "L" level depending on whether the change $\Delta T$ of the torque is greater than a predetermined value. Namely, the binary output voltage $V_M$ goes to the "L" level when $\Delta T < -\Delta$ ($\Delta$ is a predetermined positive torque) and it goes to the "H" level when $\Delta T \geq \Delta$.

The phase detector circuit 31 comprises AND circuits 55 and 58, NOT circuits 56 and 57 and an OR circuit 59 and its output voltage $V_R$ at an output point R goes to the "H" level when both of the voltages $V_N$ and $V_M$ at the points N and M are at the "H" level or the "L" level, while it goes to the "L" level when either of the voltage $V_N$ or $V_M$ at the point N or M is at the "H" level and the other is at the "L" level. The output voltage $V_R$ of the phase detector circuit 31 is integrated and smoothed by the integrator 32 comprising a differential operational amplifier 60 and an output voltage $V_D$ is generated at its output or a point D. The output voltage $V_D$ and a divided voltage of the voltage $V_N$ at the point N are applied to the adder 33 and in this way the voltage corresponding to the periodic change is superimposed on the output voltage $V_D$ thus generating a control voltage $V_C$ at the point C. The adder 33 comprises a differential operational amplifier 67 so that according to the polarity of the voltages $V_D$ and $V_N$ at the points D and N the voltage $V_D$ at the point D is applied to the inverting input terminal and the voltage $V_N$ at the point N is applied to the non-inverting input terminal. The ignition timing is controlled by this control voltage $V_C$.

Numerals 68 and 69 designate a D.C. power source of which the positive output terminal +V and negative output terminal −V are respectively connected to the +V and −V terminals of the respective circuits.

With the construction described above, the control system according to the invention operates as follows. While it is desirable to use a higher repetition frequency for the periodic change signal generator 12 to improve the response characteristic of the control system, it must be set below several Hz in view of the delay in detection by the engine torque detector 2. The operation of the control system will now be described with reference to three cases where the ignition timing $\theta$ of the ignition system is retarded ($\theta = \theta_R$), correct ($\theta = \theta_o$) and advanced ($\theta = \theta_A$), respectively, with respect to the optimum ignition timing $\theta_o$ of the engine shown in FIG. 1.

Firstly, when $\theta = \theta_R$, the engine torque for $\theta_R + \Delta\theta$ is higher than that for $\theta_R - \Delta\theta$ so that as shown in FIG. 7 the voltages $V_N$ and $V_M$ at the points N and M are in phase with each other and hence the voltage $V_R$ at the point R goes to the "H" level. Consequently, the voltage $V_D$ at the point D increases with the time so that the average value of the voltage $V_C$ at the point C increases as each of the respective periodic changes $\Delta$ is superimposed thereon and consequently the ignition timing $\theta$ is also advanced with the time.

When the point is reached where $\theta = \theta_o$, the difference in the engine torque for $\pm\Delta\theta$ is no longer detectable so that the average value of the voltages $V_D$ and $V_C$ at the points D and C remains unchanged and the current value of the ignition timing is maintained.

On the other hand, when the point is reached where $\theta = \theta_A$, the engine torque corresponding to $\theta_A + \Delta\theta$ becomes lower than that corresponding to $\theta_A - \Delta\theta$ so that the phase of the voltages $V_N$ and $V_M$ at the points N and M become opposite to each other and the voltage $V_R$ at the point R goes to the "L" level. Consequently, the average values of the voltages $V_D$ and $V_C$ at the points D and C decrease with the time and thus the ignition timing is also retarded with the time.

While, in the embodiment of the present invention described above, the ignition timing is controlled by a method using analogical circuitry, it is of course possible to use many other control methods such as one employing digital circuitry or another method employing a servomotor so that the cam plate of the distributor is mechanically rotated.

While, in the above-described embodiment, the time of generation of the timing signals generated by the timing signal generator 21 in relation to the crankshaft of the engine is set at the top dead center on the compression stroke, it is possible to use another method which employs a so-called governor advance mechanism of the known type which utilizes the centrifugal force generated by the cam shaft which opens and closes the contact points of the timing signal generator 21 and a so-called vacuum advance mechanism of the known type which utilizes the boost pressure of the engine and the phase relation of the timing signals in relation to the crankshaft of the engine is roughly programmed preliminarily for program control purposes. With this method, the ignition timing may be preliminarily programmed with the accuracy to within about $\pm 5°$ of the optimum value and thus it is only necessary for the control system of this invention to correct the error precisely. In this way, it is possible to improve the response properties of the control system and reduce the time required for attaining the optimum ignition timing.

Figure 9:
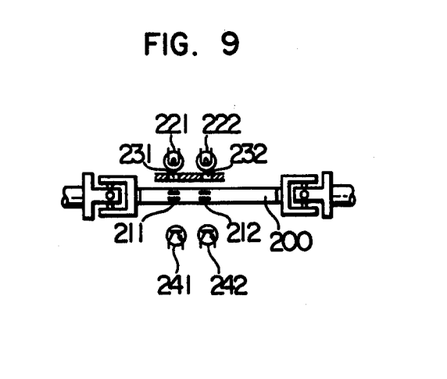
FIG. 9 is a schematic diagram showing another form of the engine torque detector used in the control system shown in FIG. 3.

Further, the engine torque detector 2 shown in FIG. 8 is intended for illustrative purposes only and it is possible to use any other type of engine torque detector which is designed to detect the amount of the twist produced in the propeller shaft which transmits the engine torque to the wheels. FIG. 9 illustrates an embodiment of this type of engine torque detector, in which numeral 200 designates a propeller shaft, 211 and 212 reflectors, 221 and 222 light sources, 231 and 232 slits for respectively directing the light from the light sources 221 and 222 to the reflectors 211 and 212, 241 and 242 phototransistors for respectively receiving the reflected light from the reflectors 211 and 212 to generate an output. The amount of the twist developed in the propeller shaft 200 changes in accordance with the magnitude of the engine torque and consequently there results a phase difference between the time at which the phototransistor 241 receives the light from the reflector 211 and the time at which the phototransistor 242 receives the light from the reflector 212 and this phase difference is detected by a phase difference detector to thereby produce an output corresponding to the engine torque. Alternately, a strain gage may be attached to the propeller shaft 200 to detect the amount of the twist therein and thereby to produce an output corresponding to the engine torque.

We claim:

1. A control system for an internal combustion engine which produces a torque comprising:
    torque change detecting means for detecting the increase and decrease of the torque developed by the internal combustion engine and producing a detection pulse signal having one output level indicative of the torque increase and another output level indicative of the torque decrease;
    periodic signal generating means for generating a periodic pulse signal of a fixed frequency, said periodic pulse signal having one output level instructing the advance of ignition timing and another output level instructing the retard of the same;
    discriminating means for discriminating phase relations between said detection pulse signal and said periodic pulse signal and producing an output signal changing in one and another directions to instruct respective advance and retard of ignition timing while the phase relations are discriminated respectively to be in phase and in opposite phase;
    superimposing means for superimposing said periodic pulse signal on said output signal and producing a control signal having an output level indicative of the ignition timing of said engine;
    sawtooth signal generating means for generating a sawtooth signal in synchronization with engine rotation, said sawtooth signal changing the output level thereof at a speed proportional to engine rotational speed; and
    ignition control means for igniting said engine when the output levels of said control signal and said sawtooth signal become equal to each other.

2. A control system according to claim 1, wherein said torque change detecting means includes:
    a torque detector coupled to said engine for producing a torque signal having an output level corresponding to the torque developed by said engine; and a Schmitt trigger circuit including a coupling capacitor for detecting the increase and decrease of said torque upon receipt of output level changes of said torque signal transmitted via said coupling capacitor.

3. A control system according to claim 2, wherein said torque detector includes a potentiometer provided between said engine and a vehicle body to be responsive to a twisting motion of said engine.

4. A control system according to claim 2, wherein said torque detector includes:
   a pair of reflectors mounted on the power transmission shaft of said engine upstream and downstream thereof, respectively;
   light sources provided for each of said reflectors for directing the light thereto; and
   light receivers associated with each of said reflectors for receiving the light reflected therefrom.

5. A control system according to claim 1, wherein said discriminating means includes:
   a logic circuit connected to said torque change detecting means and said periodic signal generating means for making a predetermined logical operation on said detection pulse signal and said periodic pulse signal; and
   an integration circuit connected to said logic circuit for integrating the output signal of said logic circuit with respect to time to thereby produce said output signal changing in said one and another directions.

6. A control system according to claim 1, wherein said sawtooth signal generating means includes:
   a timing signal generator for generating a timing signal at a predetermined rotational angle of said engine;
   a converter circuit connected to said timing signal generator for converting the frequency of said timing signal into a speed signal having the output level proportional to said engine rotational speed; and
   an integration circuit connected to said timing signal and said converter circuit for integrating said speed signal in response to said timing signal to thereby produce said sawtooth signal.

7. A control system according to claim 6, wherein said discriminating means includes:
   a logic circuit connected to said torque change detecting means and said periodic signal generating means for making an AND logic operation on said detection pulse signal and said periodic pulse signal; and
   an integration circuit connected to said logic circuit for integrating the output signal of said logic circuit in said one and another directions with respect to time.

* * * * *